United States Patent [19]

Panessidi

[11] Patent Number: 4,696,260

[45] Date of Patent: Sep. 29, 1987

[54] ANIMAL SHELTER

[76] Inventor: Joseph Panessidi, 10835 Monticello, Pinckney, Mich. 48169

[21] Appl. No.: 758,257

[22] Filed: Jul. 24, 1985

[51] Int. Cl.$^4$ .............................................. A01K 1/03
[52] U.S. Cl. ...................................................... 119/19
[58] Field of Search .............................. 119/16, 19, 29; 446/476; 272/1 R, 113

[56] References Cited

U.S. PATENT DOCUMENTS

| | | | |
|---|---|---|---|
| 1,484,518 | 2/1924 | Meadows | 119/19 |
| 1,754,590 | 4/1930 | Allen | 119/19 X |
| 3,632,109 | 1/1972 | Dattner | 272/1 R |
| 3,666,266 | 5/1972 | Noguchi | 272/113 |
| 4,347,807 | 9/1982 | Reich | 119/19 |

Primary Examiner—Robert P. Swiatek
Attorney, Agent, or Firm—Wood, Dalton, Phillips, Mason & Rowe

[57] ABSTRACT

A shelter to protect an animal from extremes in climatic conditions. It includes a base member adapted to support the shelter in a fixed position relative to the ground together with a substantially enclosed structure mounted on the base member. The structure has a generally horizontal floor for supporting the animal. The floor divides the structure into an upper compartment adapted to house the animal within the structure and a lower compartment comprising a dead air space, all of which is disposed substantially entirely above the ground. The structure also has an opening providing means of ingress and egress for the animal relative to the upper compartment. It is further designed to provide a sheltered area for protecting the animal outside of the structure on the ground thereunder. Additionally, the shelter is constructed to provide light, insulation, solar heating, and protection from wind, rain, snow and other adverse weather conditions.

17 Claims, 5 Drawing Figures

ANIMAL SHELTER

FIELD OF THE INVENTION

This invention relates to an animal shelter and, more particularly, to a substantially enclosed structure supported substantially entirely above the ground.

BACKGROUND OF THE INVENTION

For many animals or mammals, particularly those which have been domesticated, extremes in climatic conditions can be dangerous. This is, perhaps, most pronounced in areas remote from the equator where the climate may range from extremely hot summer temperatures on the order of 100° F. or higher to winter temperatures on the order of −20° F. or lower. Moreover, in such regions, the climatic conditions may include high winds, heavy rains, deep snows, and hail storms at different times of the year.

Because of the wide range of climatic conditions, it has been a problem for the owner of animals or mammals to provide adequate shelter. For instance, the typical dog house, while adapted to provide a dog with protection from direct exposure to extremes of weather, is usually severely deficient in that it is placed directly on the ground which is frozen and extremely cold in the winter or is supported on a base which allows drafts directly under the floor provided to support the dog which, again, subjects the dog to adverse and potentially dangerous weather conditions. Additionally, the typical dog house has a centered opening which renders it impossible for the dog to escape blowing rain, snow and hail depending upon the direction of the wind.

With all of the drawbacks of a typical dog house, there has also been little or no effort to provide any form of insulation despite periods of low temperatures commonly experienced in much of the country in the winter months. Similarly, efforts to provide natural lighting within the dog house and to take advantage of solar energy have been lacking. Finally, there has been little or no effort to provide a sheltered area for protecting the animal on the ground outside of the dog house particularly during periods of high temperature commonly experienced by nearly all of the country in the summer months.

While overcoming problems of these types, it is also desirable to provide a construction which is aesthetically pleasing and enhances the surrounding environment.

The present invention is directed to overcoming the above stated problems and accomplishing the stated objectives.

SUMMARY OF THE INVENTION

Accordingly, the present invention is directed to a shelter for an animal. It includes a base member adapted to support the shelter in a fixed position relative to the ground together with a substantially enclosed structure mounted on the base member. The structure has a generally horizontal floor for supporting the animal. The floor divides the structure into an upper compartment adapted to house the animal within the structure and a lower compartment comprising a dead air space, all of which is disposed substantially entirely above the ground. The structure also includes an opening providing means of ingress and egress for the animal relative to the upper compartment. It is further designed to provide a sheltered area for protecting the animal outside of the structure on the ground thereunder. Additionally, the shelter is constructed to provide light, insulation, solar heating, and protection from wind, rain, snow and other adverse weather conditions.

In an exemplary embodiment, the structure is generally cube-shaped and includes four sides intersecting at substantially right angles. It also includes spaced parallel front and rear panels and is mounted on the base member such that two intersecting sides are disposed relative to the level of the ground at approximately a 45° angle and extend upwardly and outwardly from the point of intersection in opposite directions to provide a sheltered area for protecting the animal outside of the structure on the ground thereunder. Moreover, the structure has the opening for the animal disposed in the front panel at a point above the generally horizontal floor.

More specifically, the structure also includes an upper pair of intersecting sides forming a roof for the structure disposed over the lower pair of intersecting sides. With the generally horizontal floor extending between the lower pair of intersecting sides intermediate the tops and bottoms thereof, the upper compartment is defined in part by the upper portion of the lower pair of intersecting sides, the two additional intersecting sides forming the roof, and the generally horizontal floor. In addition, the opening is disposed to one side of the upper compartment adjacent a side edge defined by the intersection of the roof with one of the lower pair of intersecting sides.

Still more particularly, the structure also advantageously includes a sky light disposed in one of the two additional intersecting sides forming the roof. The sky light is preferably positioned adjacent the rear panel and adjacent the intersection of the two additional intersecting sides, i.e., the ridge of the roof, and is disposed on the opposite side of the structure from the opening. Furthermore, the structure advantageously includes a solar energy absorbing surface on the other of the two additional intersecting sides forming the roof.

Other objects, advantages and features will become apparent from the following specification taken in conjunction with the accompanying drawings.

DESCRIPTION OF THE PREFERRED EMBODIMENT

Figure 1:
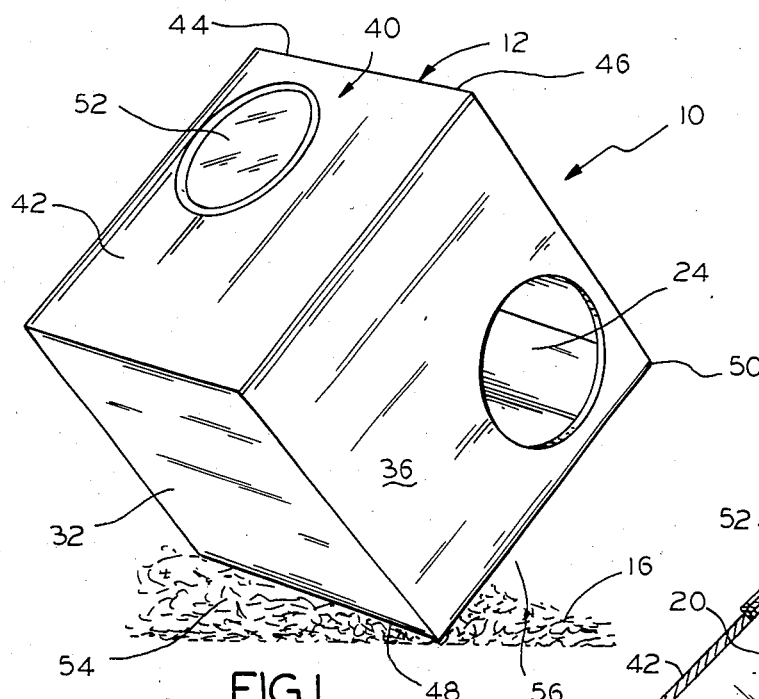
FIG. 1 is a perspective view of a shelter for an animal in accordance with the present invention.
Figures 2, 3:
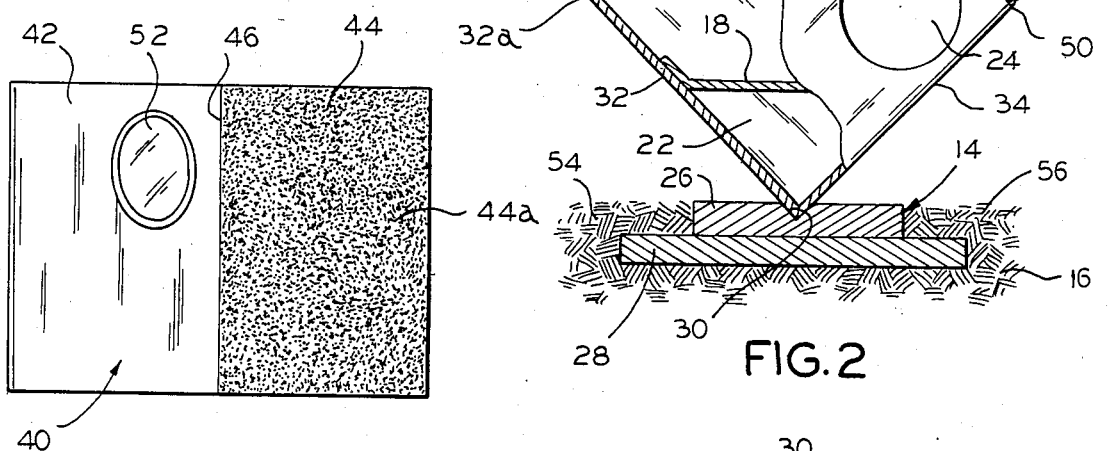
FIG. 2 is a front elevational view, partially in section, of the shelter illustrated in FIG. 1.
FIG. 3 is a plan view of the shelter illustrated in FIG. 1.

An exemplary embodiment of an animal shelter made according to the invention is illustrated in FIGS. 1 and 2. The shelter 10 comprises a substantially enclosed structure 12 mounted on a base member 14 adapted to support the shelter 10 in a fixed position relative to the ground 16. The structure 12 also has a generally horizontal floor 18 for supporting the animal, and the floor 18 divides the structure into an upper compartment 20 adapted to house the animal within the structure and a lower compartment 22 comprising a dead air space disposed substantially entirely above the ground 16 and directly under the floor 18 and upper compartment 20. The shelter 10 further includes an opening 24 providing means of ingress and egress for the animal relative to the upper compartment 20. With these features of construction, the shelter 10 is well adapted for protecting animals from a wide range of extreme weather conditions.

Figure 4:
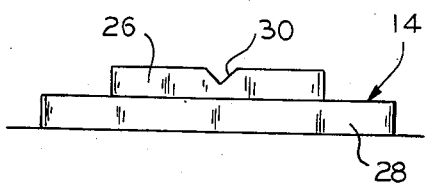
FIG. 4 is a front elevational view of a base member for the shelter illustrated in FIG. 1.
Figure 5:
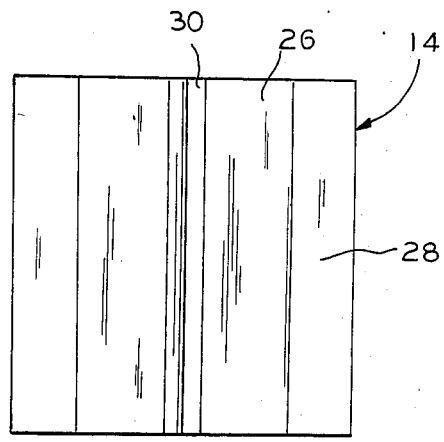
FIG. 5 is a plan view of the base member illustrated in FIG. 4.

Referring to FIGS. 4 and 5, the base member 14 is generally rectangular in shape. It includes an upper portion 26 adapted to support the structure 12 and a lower portion 28 adapted to be disposed below the surface of the ground. As shown in FIG. 2, the lower portion 28 has a greater width than the upper portion 26 to permit anchoring the structure 12 for stability. It is preferably dimensioned to closely approach the maximum width of the structure 12. With this arrangement, the structure 12 can be supported substantially entirely above the ground in a stable fashion.

Referring once again to FIGS. 4 and 5, the upper portion 26 of the base member 14 preferably includes an upwardly facing, longitudinally extending V-shaped groove 30. The structure 12 is generally cube-shaped (see FIGS. 1 and 2) and includes two sides 32 and 34 intersecting at substantially the same angle as the angle defined by the groove 30. As a result, the structure 12 can be mounted on the base member 14 with the two intersecting sides 32 and 34 disposed in the V-shaped groove 30.

As will be appreciated, the lower compartment 22 comprising the dead air space is generally triangular in cross section. It is defined in part by the two intersecting sides 32 and 34 and the generally horizontal floor 18. In addition, the lower compartment 22 is also defined by spaced parallel front and rear panels 36 and 38 cooperating with the sides 32 and 34 and the floor 18 to define the dead air space.

Referring to FIG. 2, the two intersecting sides 32 and 34 extend in opposite directions from the point of intersection in the V-shaped groove 30. In particular, the upper extents or top edges 32a and 34a of the intersecting sides 32 and 34 remote from the point of intersection are spaced apart and disposed outwardly and upwardly of the generally horizontal floor 18 such that the upper compartment 20 is defined in part by the two intersecting sides 32 and 34 upwardly of the generally horizontal floor 18 and by the generally horizontal floor itself. Moreover, the upper compartment 20 is also defined in part by the spaced parallel front and rear panels 36 and 38.

As will be appreciated by referring to FIGS. 1 through 3, a roof 40 is disposed over the upper compartment 20. It is defined by two additional intersecting roof panels 42 and 44 extending from the spaced apart locations comprising the top edges 32a and 34a of the two intersecting sides 32 and 34, respectively, inwardly and upwardly to a point of intersection 46 forming the ridge of the roof 40 which is disposed directly above the point of intersection 48 of the two intersecting sides 32 and 34 disposed in the V-shaped groove 30. As will be apparent, the upper compartment 20 is further defined by the two intersecting roof panels 42 and 44.

As shown in FIGS. 1 and 2, the opening 24 in the structure 12 is disposed in the front panel 36 at a point at or above the generally horizontal floor 18. Preferably, the opening 24 is disposed adjacent a side edge 50 defined by the intersection of the top edge 34a of one of the side panels 34 with one of the roof panels 44. In addition, the structure 12 includes a sky light 52 disposed in one of the roof panels 42 and the other of the roof panels 44 includes a solar energy absorbing surface 44a.

As previously discussed, the structure 12 is generally cube-shaped and includes four sides 32, 34, 42, 44 intersecting at substantially right angles. It is mounted on the base member 14 such that the two intersecting sides 32 and 34 are disposed relative to the level of the ground at approximately a 45° angle. In addition, the generally horizontal floor 18 extends between the two intersecting sides 32 and 34 such that the lower compartment 22 is generally triangular in cross section.

As will be appreciated by referring to FIGS. 1 and 2, the two intersecting sides 32 and 34 extend upwardly and outwardly to provide sheltered areas 54 and 56 for protecting the animal outside of the structure on the ground thereunder.

In the preferred embodiment, the opening 24 is generally circular in shape and sized to provide means of ingress and egress for the animal. It is also preferable for the sky light 52 formed, for instance, of plexiglass, to be positioned adjacent the rear panel 38 and adjacent the ridge of the roof 40 defined by the point of intersection 46 of the two roof panels 42 and 44 on the opposite side of the structure 12 from the opening 24. With this unique combination of features, the shelter 10 overcomes the stated problems and accomplishes the stated objectives in a most advantageous manner.

While not critical to the present invention, the shelter 10 can be constructed from any of a number of conventional materials. It may, for instance, be advantageous to utilize lumber specially adapted for use in an outdoor environment such as cedar or pressure treated lumber. In one advantageous construction of the present invention, the shelter 10 can be constructed from plywood laminated with Formica.

While not previously mentioned, the solar energy absorbing surface 44a will be oriented in a southerly direction. This will allow maximum absorbtion of energy from the sun in the winter months to provide warmth within the structure 12 which will be more readily maintained without drafts by reason of the insulating properties of the dead air space in the lower compartment 22 beneath the generally horizontal floor 18. Of course, by offsetting the opening 24, the possibility of exposure of the animal to blowing rain, snow and hail will be greatly reduced.

With the solar energy absorbing surface 44a facing in a southerly direction, the sky light 52 will face in a northerly direction. In this manner, the upper compartment 20 will be filled with natural light, particularly in the summer months, without unduly elevating the temperature within the upper compartment 20 on hot days due to the relatively small size of the sky light. Additionally, the entire exterior of the structure 12, with the exception of the solar energy absorbing surface 44a, can be finished to have a light colored or reflective surface to minimize heating of the upper compartment 20 during the summer months.

As will also be appreciated by referring to FIGS. 1 and 2, the unique configuration of the structure 12 will provide the sheltered or shaded areas 54 and 56 directly under the sides 32 and 34. Thus, on a particularly warm winter day with the sun's rays being directed onto the solar energy absorbing surface 44a as illustrated in FIG. 2, the animal can lie on the ground 16 in the sheltered area 54 under the side 32, which will be shaded, in the event that the upper compartment 20 reaches an uncomfortably high temperature. Similarly, on a particularly warm summer day with the sun's rays oppositely directed onto the roof panel 42, the animal can lie on the ground 16 in the sheltered area 56 under the side 34, which will then be shaded, in the event that the upper compartment 20 becomes uncomfortably hot. Also, depending upon the direction of any rain, the animal can be sheltered outside of the structure 12 in either the sheltered area 54 or 56 since the rain will run off of the roof panels 42 and 44 away from the structure 12 at a 45° angle to the ground 16.

While in the foregoing there has been set forth a preferred embodiment of the invention, it is to be understood that the invention is only to be limited by the spirit and scope of the appended claims.

I claim:

1. A shelter for an animal, comprising:
   a base member adapted to support said shelter in a fixed position relative to the ground;
   a substantially enclosed structure mounted on said base member, said structure including a generally horizontal floor for supporting said animal within said structure, said floor dividing said structure into an upper compartment and a lower compartment;
   said base member being generally rectangular in shape, said base member including an upper portion adapted to support said structure and a lower portion adapted to be disposed below the surface of the ground, said lower portion having a greater width than said upper portion;
   said upper portion of said base member including an upwardly facing, longitudinally extending V-shaped groove, said structure being generally cube-shaped and including two sides intersecting at substantially the same angle as the angle defined by said groove, said structure being mounted on said base member with said two intersecting sides disposed in said V-shaped groove;
   said upper compartment being adapted to house and protect said animal within said structure, said lower compartment comprising a dead air space, said lower compartment being disposed substantially entirely above the ground; and
   an opening in said structure providing means of ingress and egress for said animal relative to said upper compartment.

2. The shelter as defined by claim 1 wherein said lower compartment comprising said dead air space is generally triangular in cross section, said lower compartment being defined in part by said two intersecting sides and said generally horizontal floor, said lower compartment also being defined in part by spaced parallel front and rear panels.

3. The shelter as defined by claim 2 wherein said two intersecting sides extend from said V-shaped groove to spaced apart locations disposed outwardly and upwardly of said generally horizontal floor, said upper compartment being defined in part by said two intersecting sides upwardly of said generally horizontal floor and by said generally horizontal floor, said upper compartment also being defined in part by said spaced parallel front and rear panels.

4. The shelter as defined by claim 3 including a roof disposed over said upper compartment, said roof being defined by two intersecting panels extending from said spaced apart locations comprising top edges of said two intersecting sides inwardly and upwardly to a point of intersection disposed directly above the point of intersection of said two intersecting sides, said upper compartment also being defined by said two intersecting roof panels.

5. The shelter as defined by claim 4 wherein said opening in said structure is disposed in said front panel at a point above said generally horizontal floor, said opening being disposed adjacent a side edge defined by the intersection of one of said sides with one of said roof panels.

6. The shelter as defined by claim 4 wherein said structure includes a sky light disposed in one of said roof panels, the other of said roof panels having a solar energy absorbing surface.

7. A shelter for an animal, comprising:
   a base member adapted to support said shelter in a fixed position relative to the ground;
   a substantially enclosed structure mounted on said base member, said structure being generally cube-shaped and including four sides intersecting at substantially right angles, said structure also including spaced parallel front and rear panels, said structure further including a generally horizontal floor for supporting said animal within said structure, said floor dividing said structure into an upper compartment and a lower compartment;
   said upper compartment being adapted to house and protect said animal within said structure, said lower compartment comprising a dead air space, said lower compartment being disposed substantially entirely above the ground;
   said structure being mounted on said base member with two intersecting sides disposed relative to the level of the ground at approximately a 45° angle, said generally horizontal floor extending between said two intersecting sides to define said lower compartment comprising said dead air space as generally triangular in cross section; and
   an opening in said structure providing means of ingress and egress for said animal relative to said upper compartment, said opening in said structure being disposed in said front panel at a point above said generally horizontal floor.

8. The shelter as defined by claim 7 wherein said generally horizontal floor extends between said two intersecting sides intermediate the tops and bottoms thereof, said lower compartment being defined in part by said two intersecting sides and said generally horizontal floor, said lower compartment also being defined in part by said spaced parallel front and rear panels.

9. The shelter as defined by claim 8 wherein said structure is also mounted on said base member with two intersecting panels forming a roof over said two intersecting sides, said upper compartment being defined in part by said generally horizontal floor, said two intersecting sides above said generally horizontal floor, and said two intersecting panels forming said roof.

10. The shelter as defined by claim 9 wherein said upper compartment is further defined by said spaced parallel front and rear panels, said opening being disposed to one side of said upper compartment adjacent a side edge defined by the intersection of said roof with one of said two intersecting sides, said opening being generally circular in shape and sized to provide means of ingress and egress for said animal.

11. The shelter as defined by claim 10 wherein said structure also includes a sky light disposed in one of said two intersecting panels forming said roof, said sky light being positioned adjacent said rear panel and adjacent the intersection of said two roof panels, said sky light being disposed on the opposite side of said structure from said opening.

12. The shelter as defined by claim 11 wherein said structure further includes a solar energy absorbing surface on the other of said two roof panels.

13. A shelter for an animal, comprising:
- a base member adapted to support said shelter in a fixed position relative to the ground;
- a substantially enclosed structure mounted on said base member, said structure being generally cube-shaped and including four sides intersecting at substantially right angles, said structure also including spaced parallel front and rear panels, said structure further including a generally horizontal floor for supporting said animal within said structure, said floor dividing said structure into an upper compartment and a lower compartment;
- said upper compartment being adapted to house and protect said animal within said structure, said lower compartment comprising a dead air space, said lower compartment being disposed substantially entirely above the ground;
- said structure being mounted on said base member with two intersecting sides disposed relative to the level of the ground at approximately a 45° angle, said two intersecting sides extending upwardly and outwardly to provide a sheltered area for protecting said animal outside of said structure on the ground thereunder; and
- an opening in said structure providing means of ingress and egress for said animal relative to said upper compartment, said opening in said structure being disposed in said front panel at a point above said generally horizontal floor.

14. The shelter as defined by claim 13 wherein said structure is also mounted on said base member with two additional intersecting sides forming a roof over said two intersecting sides disposed relative to the level of the ground at approximately a 45° angle.

15. The shelter as defined by claim 14 wherein said opening is disposed to one side of said upper compartment adjacent a side edge defined by the intersection of said roof with one of said two intersecting sides disposed relative to the level of the ground at approximately a 45° angle.

16. The shelter as defined by claim 15 wherein said structure also includes a sky light disposed in one of said two additional intersecting sides, said sky light being positioned adjacent said rear panel and adjacent the intersection of said two additional intersecting sides, said sky light being disposed on the opposite side of said structure from said opening.

17. The shelter as defined by claim 16 wherein said structure further includes a solar energy absorbing surface on the other of said two additional intersecting sides.

* * * * *